United States Patent
Wu et al.

(10) Patent No.: US 8,925,855 B1
(45) Date of Patent: Jan. 6, 2015

(54) LINE WINDING DEVICE

(71) Applicants: Michael Yong Wu, Chino Hills, CA (US); Xiren Wang, Weihai (CN)

(72) Inventors: Michael Yong Wu, Chino Hills, CA (US); Xiren Wang, Weihai (CN)

( * ) Notice: Subject to any disclaimer, the term of this patent is extended or adjusted under 35 U.S.C. 154(b) by 41 days.

(21) Appl. No.: 13/931,375

(22) Filed: Jun. 28, 2013

Related U.S. Application Data

(60) Provisional application No. 61/681,861, filed on Aug. 10, 2012.

(51) Int. Cl.
*B65H 16/06* (2006.01)
*A01K 89/00* (2006.01)

(52) U.S. Cl.
CPC ............ *A01K 89/003* (2013.01); *Y10S 242/902* (2013.01)
USPC ........................................ 242/596.3; 242/902

(58) Field of Classification Search
CPC ... A01K 89/00; A01K 89/003; Y10S 242/902
USPC ............. 242/902, 596.3, 596.7, 596.8, 599.2, 242/588
See application file for complete search history.

(56) References Cited

U.S. PATENT DOCUMENTS

| | | | | |
|---|---|---|---|---|
| 2,903,196 A | * | 9/1959 | Fowler | 242/388.7 |
| 3,026,059 A | * | 3/1962 | Dennler | 242/593 |
| 3,261,569 A | * | 7/1966 | Bedell | 242/136 |
| 3,950,881 A | * | 4/1976 | Hays | 43/25 |
| 3,951,354 A | * | 4/1976 | Bagby | 242/129.8 |
| 4,776,527 A | * | 10/1988 | Prowant | 242/591 |
| 5,029,409 A | * | 7/1991 | Nouwens | 43/25 |
| 5,218,779 A | * | 6/1993 | Morgan et al. | 43/25 |
| 5,375,788 A | * | 12/1994 | English | 242/129.8 |
| 5,513,463 A | * | 5/1996 | Drinkwater | 43/25 |

* cited by examiner

*Primary Examiner* — William A Rivera
(74) *Attorney, Agent, or Firm* — Plager Schack LLP

(57) ABSTRACT

A line winding device prevents line twisting by allowing feeding of line from a line spool rotor to a fishing reel rotor along a first central axis and rotation of the line spool rotor about a second central axis. The line winding device includes a handle which can accommodate a fishing reel that requires winding of line onto the fishing reel rotor. A swivel assembly attached to the handle comprising at least one pair of arms, which can hold a line spool rotor in order to permit rotation of a line spool rotor around a first central axis while permitting rotation of the swivel assembly about a second central axis. A user can transfer line from the line spool rotor to the fishing reel rotor without line twisting due to the ability of the line spool rotor to rotate about a first central axis and a second central axis.

7 Claims, 3 Drawing Sheets

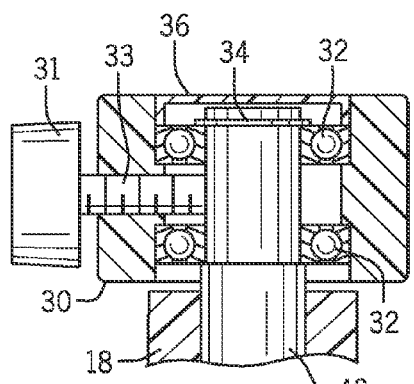
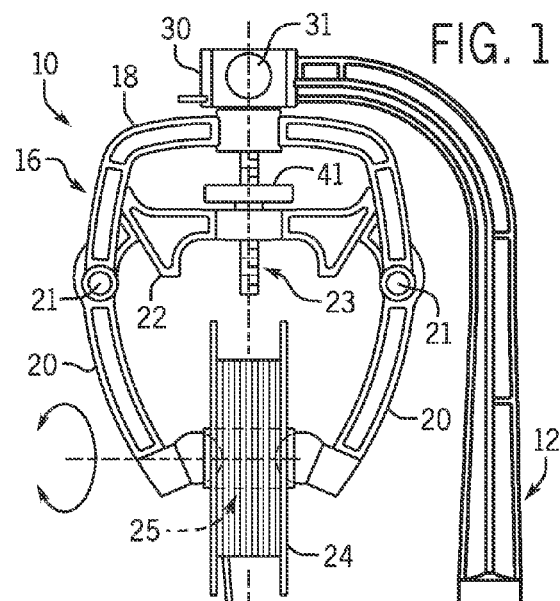
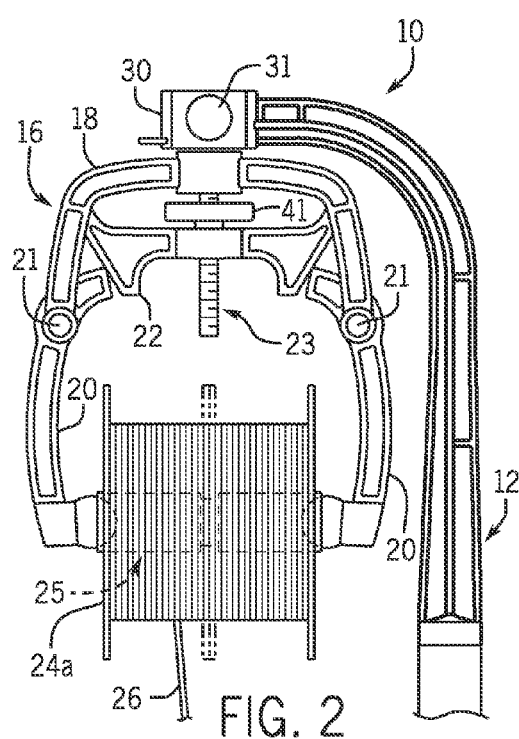

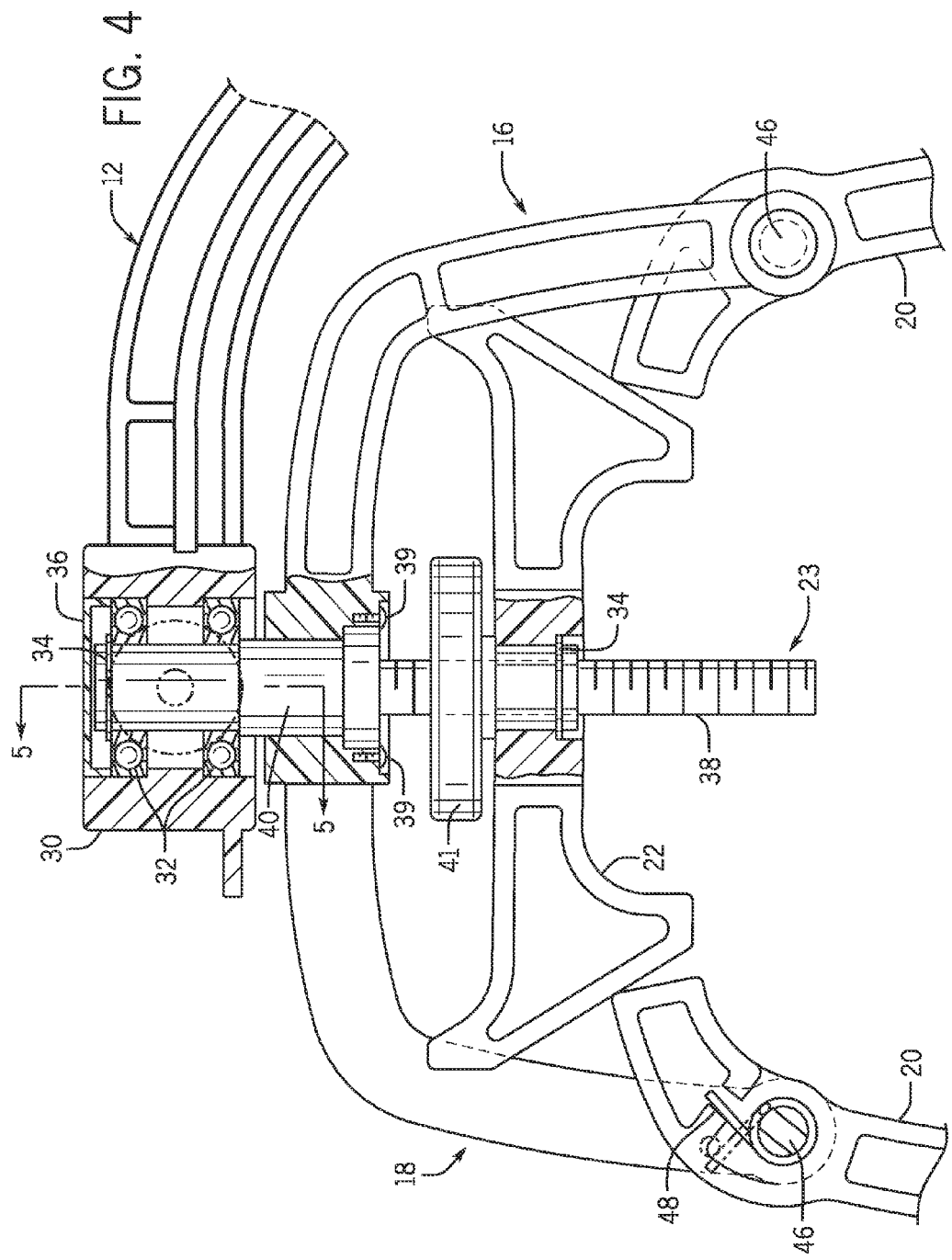

LINE WINDING DEVICE

RELATED APPLICATION

This application claims priority to provisional patent application U.S. Serial No. 61/681,861 filed on Aug. 10, 2012, the entire contents of which is herein incorporated by reference.

BACKGROUND

The embodiments herein relate generally to devices that can be used to wind line.

To fish, in general, a fishing line is commonly attached to a fishing reel rotor and something is attached to the line to catch fish. Over time, and after being stored during the off season, the fishing line will wear out, and develop a "memory" of being looped around the fishing reel rotor, making casting more difficult, and tangles more likely. For best results, one should replace the fishing line at least once per season.

Prior to embodiments of the disclosed invention, winding line from a fishing line rotor onto a fishing reel rotor is very challenging because the rotation of the fishing reel rotor twists the fishing line, one twist for every fishing reel rotor rotation. Since the fishing reel rotor does not have a mechanism to eliminate line twists when transferring line from a fishing line rotor to a fishing reel rotor, the rotating process will create line twists, resulting in the line becoming fouled.

SUMMARY

A line winding device prevents line twisting by allowing feeding of line from a line spool rotor to a fishing reel rotor along a first central axis and rotation of the line spool rotor about a second central axis. The line winding device includes a handle which can accommodate a fishing reel that requires winding of line onto the fishing reel rotor. A swivel assembly attached to the handle comprising at least one pair of arms, which can hold a line spool rotor in order to permit rotation of a line spool rotor about a first central axis while permitting rotation of the swivel assembly about a second central axis. A user can transfer line from the line spool rotor to the fishing reel rotor without line twisting due to the ability of the line spool rotor to rotate around a first central axis and a second central axis.

In some embodiments, the swivel assembly further contains a pair of fixed arms with each fixed arm mechanically coupled to a movable arm with a pivot pin and a torsion spring. Each movable arm further comprises a first end and a second end wherein the first ends permit the movable arms to accommodate the line spool rotor while permitting the line spool rotor to rotate about the first central axis and the second central axis. The handle is mechanically coupled to a journal bearing, which is further mechanically coupled to a shaft unit allowing the shaft unit to rotate inside the journal bearing. The shaft unit includes an unthreaded portion mechanically coupled to a threaded portion. A tensioning adjustment nut and a stabilizing arm are attached to the threaded portion and the swivel assembly is immediately adjacent to the unthreaded portion wherein the stabilizing arm is immediately adjacent to the second ends. A user can adjust the tensioning adjustment nut to move the stabilizing arm along the threaded portion causing increased or decreased tension in the torsion spring, moving the second ends of the movable arms and thus moving the line spool rotor and adjusting tension on the line traveling to the fishing reel rotor.

BRIEF DESCRIPTION OF THE FIGURES

The detailed description of some embodiments of the invention is made below with reference to the accompanying figures, wherein like numerals represent corresponding parts of the figures.

FIG. 1 is a front elevation view of an embodiment of the invention in use.

FIG. 2 is a detail front elevation view of an embodiment of the invention in a second configuration.

FIG. 4 is a detail elevation of an embodiment of the invention.

FIG. 5 is a cross-sectional view taken on line 5-5 of FIG. 4.

DETAILED DESCRIPTION OF CERTAIN EMBODIMENTS

Figure 3:
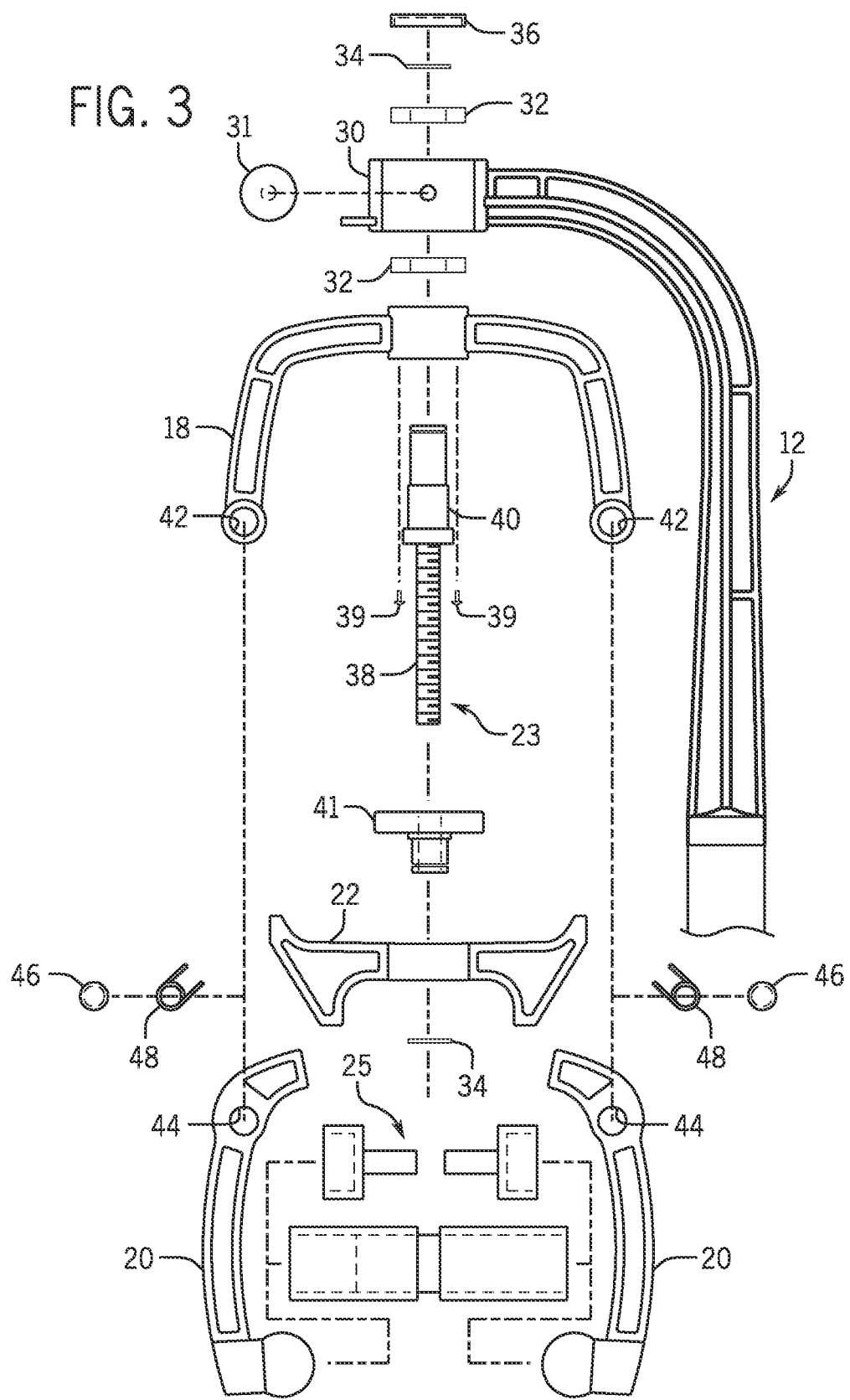
FIG. 3 is an exploded elevation view of an embodiment of the invention with parts broken away.

By way of example, and referring to FIG. 1, one embodiment of line winding device 10 comprises handle 12 attached to fishing reel rotor mount 14 which can mount fishing reel rotor 26 onto handle 12. Handle 12 is further mechanically coupled to swivel assembly 16 with shaft unit 23 through journal bearing 30 as shown in more detail in FIG. 2 and FIG. 3. Journal bearing 30 can be stopped by rotating clamping knob 31 as shown in more detail in FIG. 4 and FIG. 5.

Swivel assembly 16 comprises a pair of fixed arms 18 mechanically coupled to journal bearing 30. Each fixed arms 18 is further mechanically coupled to a movable arm 20 with pivot 21. Movable arms 20 each have a rounded first end, which can be used to hold line spool rotor 24 in place, while allowing line spool rotor 24 to rotate about a first central axis that travels through the first ends. Movable arms 20 further comprise second ends immediately adjacent to stabilizing arm 22. This construction is not exclusive and any structure that enables line spool rotor 24 to rotate about the first central axis is sufficient.

Swivel assembly 16 further comprises stabilizing arm 22, which is immediately adjacent to second ends of first fixed arm 18 and second fixed arm 18. This provides pressure against the second end of each movable arm 20 allowing swivel assembly to easily hold narrow line spool rotor 24 as shown in FIG. 2 or thick line spool rotor 24a as shown in FIG. 3. In some embodiments the rotation of line spool rotor 24 between the first ends is assisted by inserting bushings 25 between the first ends allowing line spool rotor 24 to rotate about bushings 25 instead of the first ends. In this configuration, the first central axis bisects bushings 25. In one embodiment, bushings 25 can be adjustable for single fishing line flat spools, double fishing line flat spools, and pencil hole fishing line flat spools.

As shown in FIG. 3 and FIG. 4, swivel assembly 16 further comprises shaft unit 23. Shaft unit 23 comprises unthreaded portion 40 mechanically coupled to threaded portion 38. Threaded portion 38 can be mechanically coupled to tensioning adjustment nut 41, where tensioning adjustment nut 41 is also threaded.

One unique feature of embodiments of the present invention is the ability to adjust tension on fishing line 26. Tensioning adjustment knob 41 comprises a thick adjustment end and a thinner male connector. The thinner male connector can accommodate a female connector on stabilizing arm 22. Tensioning adjustment knob 41 is mechanically coupled to stabilizing arm 22 with retainer ring 34. A user can rotate tensioning adjustment knob 41 to move stabilizing arm 22. Stabilizing arm 22 comprises a pair of flared ends, which can adjust the position of movable arms 20. As stabilizing arm 22 is pushed distant journal bearing 30, the second ends, and thus bushings 25, rotate proximate journal bearing 30 and tension increases. Alternately, as stabilizing arm 22 is pushed proximate journal bearing 30, the second ends rotate distant journal bearing 30 and tension decreases. The ability to change the tension in fishing line 26 has won industry praise. For instance, In-Fisherman's 2013 Gear Guide notes that the ability to move pivot arms 20 to compress bushings 25 "provides ideal tension for spool rotoring."

Turning to FIG. 3, there are many ways to connect fixed arms 18 and movable arms 20 in order to accomplish this result, but the following is exemplary. Fixed arms 18 each comprise fixed arm holes 42. Likewise, movable arms 20 comprise movable arm holes 44. Each fixed arm hole is mechanically coupled to a movable arm hole with pivot pin 46 and torsion spring 48. The use of torsion spring 48 amplifies the affect of moving tensioning adjustment knob 41 to adjust the position of bushings 25 and thus the tension of fishing line 26.

Shaft unit 23 provides a vehicle about which swivel assembly 16 can rotate about a second central axis, which bisects shaft unit 23 in a manner completely unknown to the prior art. It is the ability to rotate about the second central axis, which has resulted in substantial industry praise for the ease by which a user can wind fishing line 26 from spool line rotor 24 onto fishing reel rotor 28. This industry praise includes winning the Best of Show Fishing Accessory at the International Convention of Allied Sportsfishing Trades (ICAST) in 2012. The Fall 2012 issue of Salmon and Steelhead Journal notes the ICAST award and comments that embodiments of the present invention "eliminated the dreaded line twist on spinning fishing reel rotors."

With the ability to rotate about a second central axis also comes the ability to stop that movement. As shown in FIG. 4 and FIG. 5, unthreaded portion 40 passes through fixed arms 18 and first bearing 32, second bearing 32 retaining ring 34 before coming to rest inside journal bearing 30 against cap 36. Journal bearing 30 is perforated with a cavity that can accommodate threaded clamp 33, which is mechanically coupled to stop knob 31. Unthreaded portion 40 can be held in place with mounting screws 39 or any other fastener. A user can rotate stop knob 31 until threaded clamp 33 exerts sufficient pressure on unthreaded portion 40 to stop the rotation of shaft unit 23 and thus swivel assembly 16 about the second central axis.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A line winding device, configured to prevent a line from twisting by allowing feeding of the line from a line spool rotor to a fishing reel rotor along a first central axis and rotation of the line spool rotor about a second central axis, the line winding device comprising:
    a handle, configured to accommodate the fishing reel rotor that requires winding of the line about the fishing reel rotor;
    a swivel assembly, attached to the handle comprising at least one pair of arms which can hold the line spool rotor in order to permit the rotation of the line spool rotor about the first central axis while permitting the rotation of the swivel assembly about the second central axis;
    wherein a user can transfer line from the line spool rotor to the fishing reel rotor without line twisting due to an ability of the line spool rotor to rotate about the first central axis and the second central axis:
    the handle is mechanically coupled to a journal bearing which is further mechanically coupled to a shaft unit allowing the shaft unit to rotate inside the journal bearing;
    the shaft unit is mechanically coupled to the swivel assembly and the second central axis is parallel to the shaft unit; and
    the swivel assembly further comprises the pair of fixed arms with each fixed arm mechanically coupled to a movable arm which permits the movable arms to accommodate the line spool rotor permitting the line spool rotor to rotate about the first central axis and the second central axis.

2. The line winding device of claim 1,
    the handle is mechanically coupled to a journal bearing which is further mechanically coupled to a shaft unit allowing the shaft unit to rotate inside the journal bearing;
    the journal bearing comprises a cavity that can accommodate a clamping knob which can be tightened onto the journal bearing to prohibit movement of the shaft unit around the second central axis.

3. The line winding device of claim 1,
    a tensioning adjustment nut and a stabilizing arm are attached to the threaded portion and the swivel assembly is immediately adjacent to the unthreaded portion wherein the stabilizing arm is immediately adjacent to the second ends;
    wherein the user can adjust the tensioning adjustment nut to move the stabilizing arm along the threaded portion moving the second ends of the movable arms and thus moving the line spool rotor and adjusting tension on the line traveling to the fishing reel rotor.

4. The line winding device of claim 1,
    a tensioning adjustment nut and a stabilizing arm are attached to the threaded portion and the swivel assembly is immediately adjacent to the unthreaded portion wherein the stabilizing arm is immediately adjacent to the second ends;
    wherein the user can adjust the tensioning adjustment nut to move the stabilizing arm along the threaded portion causing increased or decreased tension in the torsion spring, moving the second ends of the movable arms and thus moving the line spool rotor and adjusting tension on the line traveling to the fishing reel rotor.

5. A line winding device, configured to prevent a line from twisting by allowing feeding of the line from a line spool rotor to a fishing reel rotor along a first central axis and rotation of the line spool rotor about a second central axis, the line winding device comprising:
    a handle, configured to accommodate the fishing reel rotor that requires winding of the line about the fishing reel rotor;
    a swivel assembly, attached to the handle comprising at least one pair of arms which can hold the line spool rotor in order to permit the rotation of the line spool rotor about the first central axis while permitting the rotation of the swivel assembly about the second central axis;
    wherein a user can transfer line from the line spool rotor to the fishing reel rotor without line twisting due to an ability of the line spool rotor to rotate about the first central axis and the second central axis;

the handle is mechanically coupled to a journal bearing which is further mechanically coupled to a shaft unit allowing the shaft unit to rotate inside the journal bearing; and the journal bearing comprises a cavity that can accommodate a clamping knob which can be tightened onto the journal bearing to prohibit movement of the shaft unit around the second central axis.

6. The line winding device of claim 5, further comprising:

a tensioning adjustment nut and a stabilizing arm are attached to the threaded portion and the swivel assembly is immediately adjacent to the unthreaded portion wherein the stabilizing arm is immediately adjacent to the second ends;

wherein the user can adjust the tensioning adjustment nut to move the stabilizing arm along the threaded portion moving the second ends of the movable arms and thus moving the line spool rotor and adjusting tension on the line traveling to the fishing reel rotor.

7. The line winding device of claim 5, further comprising:

a tensioning adjustment nut and a stabilizing arm are attached to the threaded portion and the swivel assembly is immediately adjacent to the unthreaded portion wherein the stabilizing arm is immediately adjacent to the second ends; and wherein the user can adjust the tensioning adjustment nut to move the stabilizing arm along the threaded portion causing increased or decreased tension in the torsion spring, moving the second ends of the movable arms and thus moving the line spool rotor and adjusting tension on the line traveling to the fishing reel rotor.

* * * * *